Oct. 8, 1968  R. H. TAYLOR  3,404,504
CABLE ANCHOR
Filed Aug. 19, 1966  2 Sheets-Sheet 1
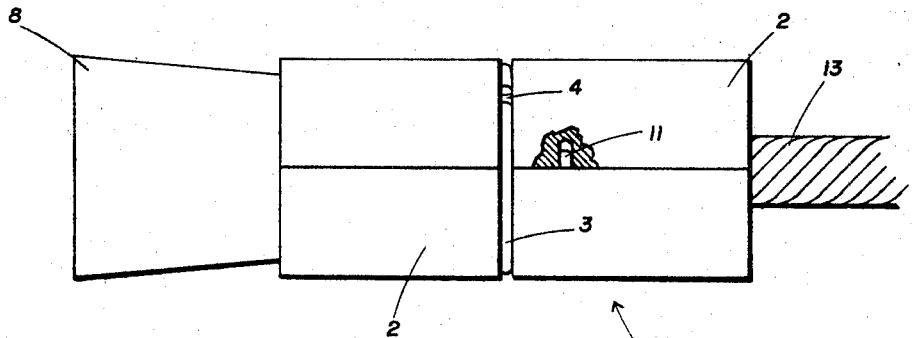
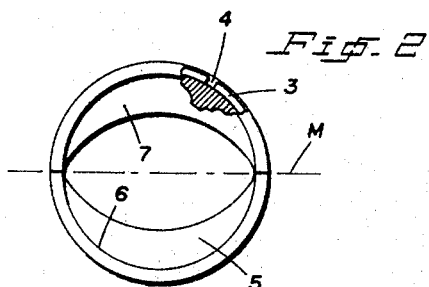
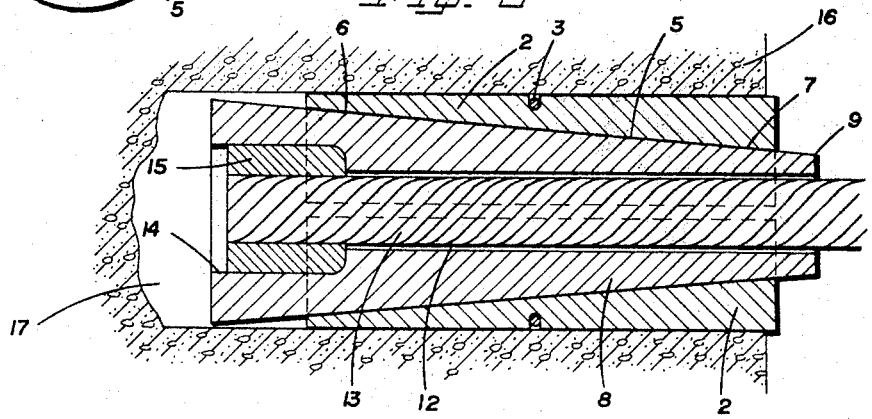
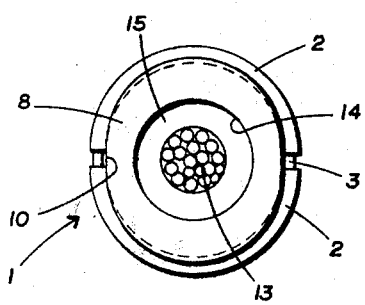
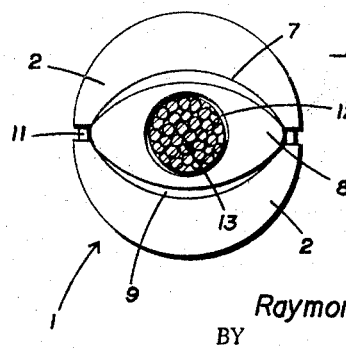
INVENTOR.
Raymond H. Taylor
BY
Webster & Webster
ATTORNEYS

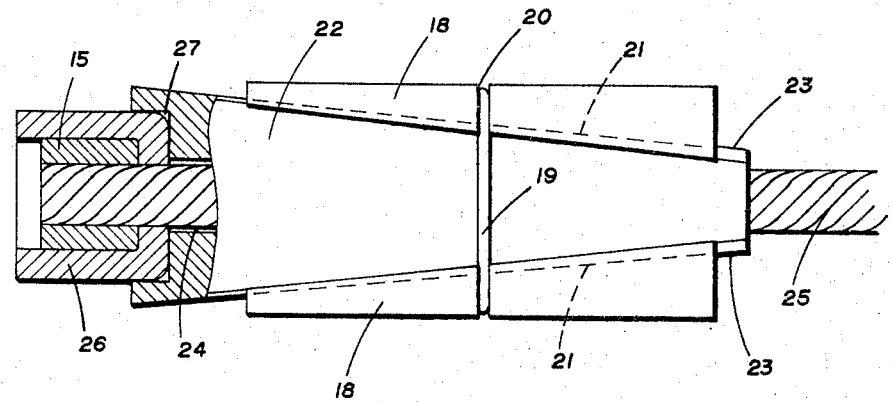
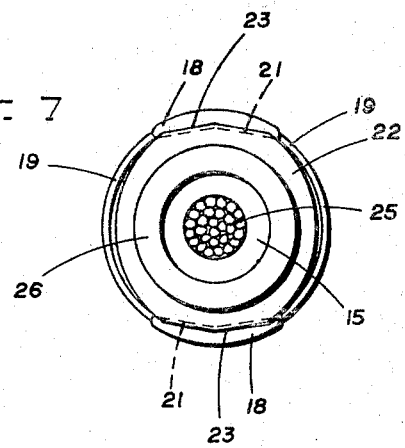
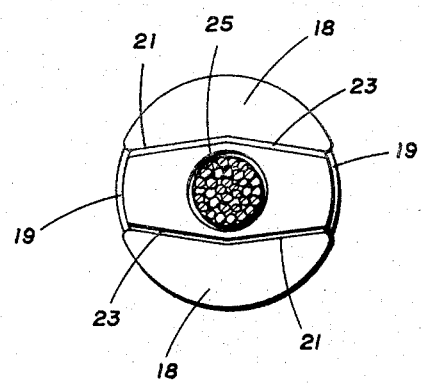

United States Patent Office 3,404,504
Patented Oct. 8, 1968

3,404,504
CABLE ANCHOR
Raymond H. Taylor, P.O. Box 641,
Bishop, Calif. 93514
Filed Aug. 19, 1966, Ser. No. 573,709
4 Claims. (Cl. 52—711)

ABSTRACT OF THE DISCLOSURE

A cable anchor, for wedging engagement in a preformed bore in rock or concrete, comprised of a taper-bored shell formed of a number of radially separable longitudinal sections, and an elongated wedge slidably engaged in the bore of the shell and movable in a direction to cause radial separation of said shell sections and resultant clamping of the cable anchor in said preformed bore; the wedge having a longitudinal bore therethrough, the cable extending entirely through the wedge bore from its outer end, and a stop on the inner end of the cable abutting the rear end of the wedge.

This invention relates in general to an improved cable anchor.

In particular, the invention is directed to, and it is a major object to provide, a novel anchor device by means of which one end of a cable may be readily and positively secured in a preformed bore in a solid rock or concrete wall; the device being especially designed, but not limited, for use in mines.

An additional object of the invention is to provide a cable anchor constructed so that the greater the pull on the cable, the greater will be the holding action of the anchor.

Another object of the invention is to provide a cable anchor so constructed that detachment or disengagement of the cable from the wall may be easily and quickly effected whenever desired.

A further object of the invention is to provide a cable anchor which is designed for ease and economy of manufacture, and convenience of use.

A still further object of the invention is to provide a practical, reliable, and durable cable anchor and one which is exceedingly effective for the purpose for which it is designed.

These objects are accomplished by means of such structure and relative arrangement of parts as will fully appear by a perusal of the following specification and claims.

In the drawings:

FIG. 1 is a side elevation of the improved cable anchor, shown before any anchoring pressure is applied to the wedge by the cable.

FIG. 2 is a rear end view of the anchoring shell of the device, partly broken out and in section.

FIG. 3 is a sectional elevation of the device, shown as engaged in a bore preformed in a solid wall.

FIG. 4 is a rear end view of the device, showing the shell as expanded but detached from the wall.

FIG. 5 is a similar view, but looking at the front end of the device.

FIG. 6 is a side elevation of a modified form of the cable anchor, partly broken out and in section, and shown with the shell in its initial or non-expanded condition.

FIG. 7 is a rear end elevation of such modified device.

FIG. 8 is a front end view of the same.

Referring now more particularly to the drawings and to the characters of reference marked thereon, and particularly at present to the form of cable anchor shown in FIGS. 1–5, inclusive, said anchor comprises an elongated cylindrical shell indicated generally at 1, and made up of a pair of semicircular sections 2. The sections 2 are initially but yieldably held together against separation in a radial direction by means of a split spring ring 3 which surrounds the shell 1 centrally of its ends and is seated in a groove 4 in said shell.

The shell 1 is formed with a full-length taper bore 5 which—when the shell sections are in contact with each other—is circular at its rear end, as at 6, and is oval at its forward end, as at 7; the major axis M of the oval form being coincident with the line of separation of the shell sections. Also, the length of such major axis M is the same throughout its extent as the diameter of the rear end 6 of the bore 5, so that said bore is a constant width from end to end in the plane of said major axis.

Provided to engage in and cooperate with the bore 5 of the shell 1 (from the rear end thereof) is an elongated wedge 8; said wedge being considerably longer than the shell. The wedge 8 is symmetrical to the bore 5, and is the same width from end to end as the major axis M of said bore. However, in a plane at right angles to said major axis M, the wedge 8 at its forward end is oval in form, as shown at 9 in FIG. 5, to correspond to the oval 7 of the shell bore 5, while at its rear end the wedge is of generally circular form to fit within the shell 1 at its rear end but is slightly elongated or oblong, as shown at 10 in FIG. 4. It will be understood that the particular shape of the taper bore 5 changes gradually from the initially full-circle form at its rear large end to the relatively small oval form at its forward end, and the wedge is correspondingly shaped.

The wedge 8 being no wider at any point than the width of the bore of the sections 2 of the shell, there is no tendency of the wedge—as it is advanced—to deform or laterally spread the sections at their adjacent edges; the only effect of advance of the wedge into the shell being to separate said sections in a radial direction. By reason of the odd shape of the wedge 8 as described, it can only be fitted in one certain position into the shell 1, and cannot rotate therein, so that there is no possibility of other than a proper separation of the shell sections 2 being effected when the device is installed.

In order to maintain the shell sections 2 in initial alinement and thus relieve the spring ring 3 of any twisting strains before the wedge 8 is placed in the bore 5, the shell sections 2 are provided on each side with a dowel and socket unit 11, as shown in FIG. 1.

The wedge 8 is formed with a longitudinal central bore 12 therethrough to receive one end portion of the cable 13 to be anchored. Such portion of the cable is fixed at its end in connection with the wedge 8 at the rear end of the latter by suitable means. As here shown, such means comprises a relatively large diameter socket 14 drilled into the rear end of the wedge 8 concentric with the bore 12 and into which socket the rear end of the cable projects. The socket 14 about said rear end of the cable is then filled with initially molten lead 15 or the like.

In use of the described cable anchor, the solid wall 16 in which the cable 13 is to be anchored is first provided with a drilled bore 17 of a diameter to closely receive the shell 1 when the latter is in its initial unexpanded condition; the bore 17 being of a depth somewhat greater than the total length of the anchor. Then, while initially holding the shell 1 in the wall bore 17 by hand if necessary, a pulling strain is applied to the cable and which advances the wedge 8 in the shell. This causes the sections 2 of the shell 1 to be separated radially and forced into clamping engagement with the surface of the wall bore 17, as shown in FIG. 3; such action firmly securing or anchoring the cable in and against longitudinal movement relative to the wall 16.

When the shell sections 2 are in such clamping engagement in the wall bore 17, the wedge 8 will project a short distance beyond the forward end of the shell, as shown in FIG. 2. Thus, when it is desired to disengage the cable from its anchored position, it is only necessary to strike the projecting end of the wedge 8 sharply with a hammer whereby said wedge is driven rearwardly relative to the shell 1. This allows the spring ring 3 to contract the shell sections and pull them away from the surface of the bore 17 so that the anchor as a whole can be withdrawn out of said bore and from the wall 16.

In the modified form of the anchor shown in FIGS. 6–8, inclusive, the elongated, wall-engaging members of the anchor—rather than being half-circle sections as in the form of FIGS. 1–5, inclusive—are arcuately relatively short sections or shoes 18. The radius of each shoe 18 is substantially the same as that of the wall bore into which the anchor is to be placed. The shoes 18 are held against accidental separation and yieldably maintained in an initially relatively contracted position by a spring ring 19 engaged in alined grooves 20 in the peripheral surface of said shoes.

The shoes 18, which are disposed in diametrally opposed relation, are radially thicker at their forward ends than at their rear ends, and each shoe is formed on its inner surface with a full-width large-angle V-shaped groove 21. The grooves 21 in the two shoes 18 slope toward each from the rear end to the forward end of the shoes as shown in FIG. 6, and are the same angle from end to end.

An elongated taper wedge 22 fits between the shoes 18 to maintain them separated; said wedge being formed on opposed surfaces with longitudinal, full-length angular ridges 23 which match and fit the grooves 21. The width of the wedge 22, in a plane at right angles to the ridges 23, is substantially constant from end to end but in any case the width is such that the wedge will not contact the spring ring 19. The wedge, of course, not only serves to maintain the shoes separated from each other but acts— upon relative longitudinal movement—to urge them further apart when the anchor is in use. The specific angular grooves 21 and ridges 23 on the shoes and wedge, respectively, prevent any possible relative rotary movement of said shoes.

The wedge 22 is provided with a central longitudinal bore 24 therethrough to receive one end portion of the cable 25 to be anchored. At the rear end of the wedge, the end of said portion of the cable is leaded, as shown in FIG. 6, into a choker button or stop head 26 which is separate from the wedge. This button is of a size such that it removably fits in a socket 27 in the rear end of the wedge. If desired, the cable 25 may instead be secured directly in the wedge in the manner shown in FIG. 3. Similarly, the choker button 26 and receiving socket 27 as shown in FIG. 6 may if desired be employed in association with the wedge shown in FIG. 3 and in lieu of the cable-securing means there illustrated.

In use, the cable anchor of the embodiment of FIGS. 6–8, inclusive, is engaged and releasably anchored in a preformed bore in a solid wall in the same expeditious manner as hereinbefore described with respect to the embodiment of FIGS. 1–5, inclusive.

From the foregoing description, it will be readily seen that there has been produced such a cable anchor as substantially fulfills the objects of the invention, as set forth herein.

While this specification sets forth in detail the present and preferred construction of the cable anchor, still in practice such deviations from such detail may be resorted to as do not form a departure from the spirit of the invention, as defined by the appended claims.

Having thus described the invention, the following is claimed as new and useful and upon which Letters Patent is desired:

1. A cable anchor comprising a tubular elongated taperbored shell adapted to initially slidably engage in a preformed bore in a solid wall or the like, the shell being formed of a number of radially separable longitudinal sections, an elongated wedge initially slidably engaged in the shell, the wedge being shaped to engage the inner faces of the sections to cause the same to be radially separated and clamped in the wall bore upon sliding advance of the wedge from a predetermined initial position, the wedge being formed with a longitudinal bore extending entirely therethrough, the cable extending through said bore in the wedge from the forward end to the rear end thereof, and a stop fixed on the inner end of the cable and abutting the rear end of said wedge whereby a pull on the cable beyond the forward end of the wedge induces said sliding advance of the latter.

2. A cable anchor, as in claim 1, in which the wedge is provided at its rear end with a rearwardly opening socket; the stop on the inner end of the cable removably engaging in said socket.

3. A cable anchor, as in claim 2, in which said stop is a choker button.

4. A cable anchor, as in claim 2, in which said stop on the inner end of the cable is symmetrical to, but smaller than, the rear end of the wedge.

References Cited

UNITED STATES PATENTS

| 2,648,563 | 8/1953 | Hall | 294—96 |
| 3,124,385 | 3/1964 | Neptune | 52—711 |
| 3,274,744 | 9/1966 | Blum et al. | 52—704 |

FOREIGN PATENTS 495,040  8/1950  Belgium.

BOBBY R. GAY, *Primary Examiner.*

A. CALVERT, *Assistant Examiner.*